US011424651B2

(12) United States Patent
Ikemoto et al.

(10) Patent No.: US 11,424,651 B2
(45) Date of Patent: Aug. 23, 2022

(54) ROTOR

(71) Applicants: AISIN CORPORATION, Kariya (JP); AISIN SEIKI KABUSHIKI KAISHA, Kariya (JP)

(72) Inventors: Masayuki Ikemoto, Anjo (JP); Takefumi Komaki, Anjo (JP); Tsuyoshi Miyaji, Toyohashi (JP); Takamasa Takeuchi, Anjo (JP); Teppei Tsuda, Nagoya (JP)

(73) Assignees: AISIN CORPORATION, Kariya (JP); AISIN SEIKI KABUSHIKI KAISHA, Kariya (JP)

( * ) Notice: Subject to any disclaimer, the term of this patent is extended or adjusted under 35 U.S.C. 154(b) by 70 days.

(21) Appl. No.: 16/637,530

(22) PCT Filed: Sep. 3, 2018

(86) PCT No.: PCT/JP2018/032571
§ 371 (c)(1),
(2) Date: Feb. 7, 2020

(87) PCT Pub. No.: WO2019/049820
PCT Pub. Date: Mar. 14, 2019

(65) Prior Publication Data
US 2020/0259380 A1 Aug. 13, 2020

(30) Foreign Application Priority Data
Sep. 8, 2017 (JP) .............................. JP2017-172718

(51) Int. Cl.
*H02K 1/32* (2006.01)
*H02K 1/27* (2022.01)
*H02K 1/276* (2022.01)

(52) U.S. Cl.
CPC ............... *H02K 1/32* (2013.01); *H02K 1/276* (2013.01)

(58) Field of Classification Search
CPC .. H02K 1/32; H02K 1/276; H02K 9/19; H02K 1/20; H02K 1/27; H02K 1/2766
(Continued)

(56) References Cited

U.S. PATENT DOCUMENTS

2013/0020889 A1* 1/2013 Yamamoto ........... H02K 1/2766
310/59
2015/0381015 A1* 12/2015 Hattori ..................... H02K 9/19
310/59
(Continued)

FOREIGN PATENT DOCUMENTS

DE 10 2015 223462 A1 6/2017
JP S61-165055 U 10/1986
(Continued)

OTHER PUBLICATIONS

Oct. 16, 2018 International Search Report issued in International Patent Application No. PCT/JP2018/032571.

*Primary Examiner* — Alex W Mok
(74) *Attorney, Agent, or Firm* — Oliff PLC

(57) ABSTRACT

A rotor that includes a shaft; a rotor core that is attached to the shaft and that is configured of a plurality of electric steel plates that are stacked; and a permanent magnet that is embedded in the rotor core, wherein: a coolant supply port that supplies a coolant to the rotor core is provided in the shaft, and at least two electric steel plates of the plurality of electric steel plates each include a first portion that has a first thickness in a rotational axis direction and a second portion that has a second thickness in the rotational axis direction, which is thinner than the first portion, the second portion extending in a radial direction and configuring a flow path (Continued)

through which the coolant supplied from the coolant supply port of the shaft flows.

10 Claims, 5 Drawing Sheets

(58) Field of Classification Search
USPC .......................................................... 310/61
See application file for complete search history.

(56) References Cited

U.S. PATENT DOCUMENTS

| 2016/0285326 | A1* | 9/2016 | Kawamura ............ H02K 1/276 |
| 2017/0012503 | A1 | 1/2017 | Okochi |
| 2017/0163110 | A1 | 6/2017 | Hattori |

FOREIGN PATENT DOCUMENTS

| JP | 2006-067777 A | 3/2006 |
| JP | 2011-67027 A | 3/2011 |
| JP | 2011-182552 A | 9/2011 |
| JP | 2015-177706 A | 10/2015 |
| JP | 2016-12979 A | 1/2016 |
| JP | 2016-144362 A | 8/2016 |
| JP | 2017-17956 A | 1/2017 |

* cited by examiner

ROTOR

BACKGROUND

The disclosure relates to a rotor.

Conventionally, a rotor that is provided with a flow path through which a coolant for cooling flows is known. Such a rotor is disclosed in Japanese Unexamined Patent Application Publication No. 2016-12979 (JP 2016-12979 A), for example.

JP 2016-12979 A described above discloses a rotor that has a rotor core, a permanent magnet that is embedded in the rotor core, and a rotary shaft. In this rotor, an in-shaft coolant path through which a coolant for cooling flows is provided in the rotary shaft. The rotor core is provided with an in-core coolant path through which the coolant supplied from the in-shaft coolant path of the rotary shaft flows. The in-core coolant path of the rotor core is provided so as to extend in a radial direction from a radially inner side to an end portion on a radially outer side of the rotor core.

The rotor core is formed by a plurality of electric steel plates that are stacked. The in-core coolant path is formed by a slit (hole portion) that extends in the radial direction and that is formed in three electric steel plates positioned in the center of the stacked electric steel plates in a rotational axis direction. After a coolant supplied from the in-shaft coolant path of the rotary shaft flows through the in-core coolant path of the rotor core, the coolant is discharged from the end portion on the radially outer side of the rotor core. In this way, the rotor core and the permanent magnet embedded in the rotor core are cooled.

SUMMARY

However, in the rotor according to JP 2016-12979 A described above, the slit (hole portion) that extends in the radial direction is provided in the electric steel plate so as to form the in-core coolant path through which the coolant flows. Thus, when the rotor is rotated at a high speed, stress that is applied to a part of the rotor core that has a relatively small thickness (width) when viewed in the rotational axis direction is increased. Here, such a part is the vicinity of the hole portion in which the permanent magnet is inserted. As a result, there is a problem that the strength of the rotor core is decreased.

An exemplary aspect of the disclosure provides a rotor in which the strength of a rotor core is suppressed from decreasing even when a flow path through which a coolant flows is provided in the rotor core.

A rotor according to an aspect of the disclosure includes: a shaft; a rotor core that is attached to the shaft and that is configured of a plurality of electric steel plates that are stacked; and a permanent magnet that is embedded in the rotor core, wherein: a coolant supply port that supplies a coolant to the rotor core is provided in the shaft, and at least two electric steel plates of the plurality of electric steel plates each include a first portion that has a first thickness in a rotational axis direction and a second portion that has a second thickness in the rotational axis direction, which is thinner than the first portion, the second portion extending in a radial direction and configuring a flow path through which the coolant supplied from the coolant supply port of the shaft flows.

In the rotor according to an aspect of the disclosure, at least two electric steel plates among the electric steel plates include a second portion that extends in the radial direction and that configures a flow path through which the coolant supplied from the coolant supply port of the shaft flows. Unlike the case in which a slit (hole portion) that extends in the radial direction is formed in the electric steel plate so as to form a flow path for a coolant, the decrease in the strength of the electric steel plate resulting from forming the flow path is suppressed by the second portion. Thus, when the rotor is rotated at a high speed, stress that is applied to a part of the rotor core that has a relatively small thickness (width) when viewed in the rotational axis direction is decreased. Here, such a part is the vicinity of the hole portion in which the permanent magnet is inserted. As a result, it is possible to suppress the strength of the rotor core from decreasing even when the flow path through which the coolant flows is provided in the rotor core.

With the disclosure, it is possible to suppress the strength of the rotor core from decreasing even when the flow path through which the coolant flows is provided in the rotor core, as described above.

DETAILED DESCRIPTION OF EMBODIMENTS

Embodiments of the disclosure will be described below with reference to the drawings.

First Embodiment

The structure of a rotor 100 according to a first embodiment will be described with reference to FIGS. 1 to 6. The rotor 100 is disposed so as to face a stator 101 in a radial direction. That is, a rotary electric machine 102 is configured of the rotor 100 and the stator 101. In the rotary electric machine 102, the stator 101 is provided with a coil (not shown). The rotary electric machine 102 is configured so that the rotor 100 rotates with the interaction between a magnetic field (magnetic flux) that is generated by the coil and a magnetic field (magnetic flux) that is generated by the rotor 100 that faces the stator 101.

In the specification, a "rotational axis direction" means a rotational axis direction of the rotor 100 (a direction along axis C1 (see FIG. 1)). A "circumferential direction" means a circumferential direction of the rotor 100 (a direction of an arrow B1 or a direction of an arrow B2 in FIG. 2). A "radial direction" means a radial direction of the rotor 100 (a direction of an arrow R1 or a direction of an arrow R2 in FIG. 2). A "radially inner side" means a radially inner side of the rotor 100 (on the arrow R1 direction side) and a "radially outer side" means a radially outer side of the rotor 100 (on the arrow R2 direction side).

(Entire Structure of Rotor)

Figure 1:
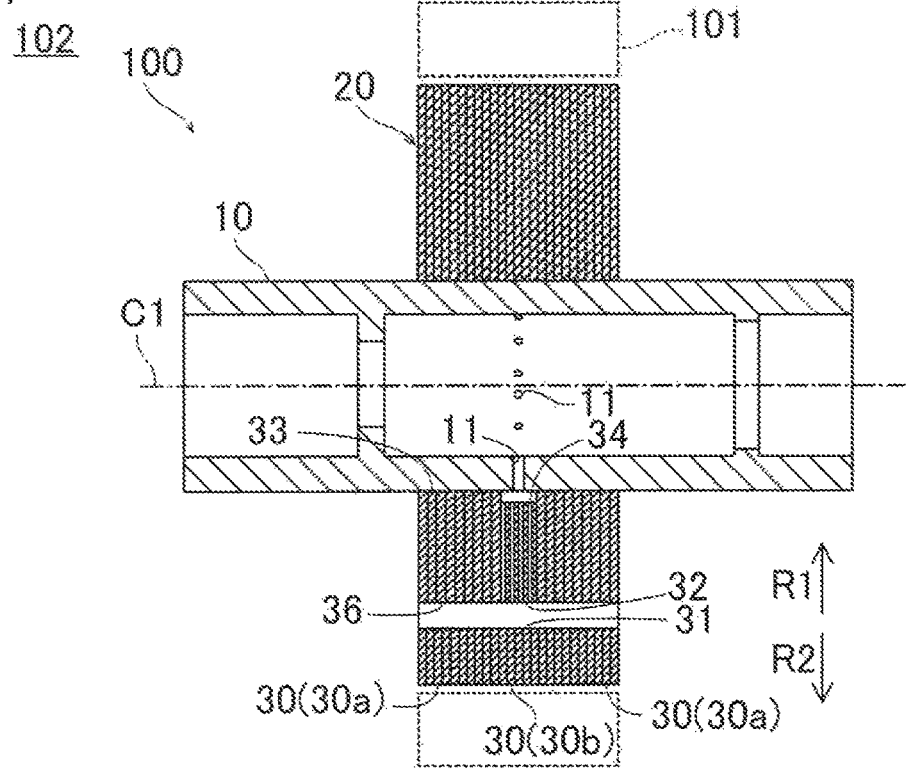
FIG. 1 is a sectional view of a rotary electric machine (rotor) according to a first embodiment (sectional view taken along line 500-500 in FIG. 2).

As illustrated in FIG. 1, the rotor 100 has a shaft 10. In the shaft 10, a coolant supply port 11 that supplies a coolant M (see FIG. 4) for cooling to a rotor core 20 is provided. The coolant M for cooling consists of oil, for example. A plurality of the coolant supply ports 11 are provided along the shaft 10 in the circumferential direction. The shaft 10 is hollow. In the shaft 10, after the coolant M moves along the rotational axis direction, the coolant M is supplied from the coolant supply port 11 to the rotor core 20 side.

The rotor 100 has the rotor core 20. The rotor core 20 is attached to the shaft 10. The rotor core 20 is configured of a plurality of electric steel plates 30 that are stacked. The electric steel plates 30 are stacked along the rotational axis direction.

Figure 2:
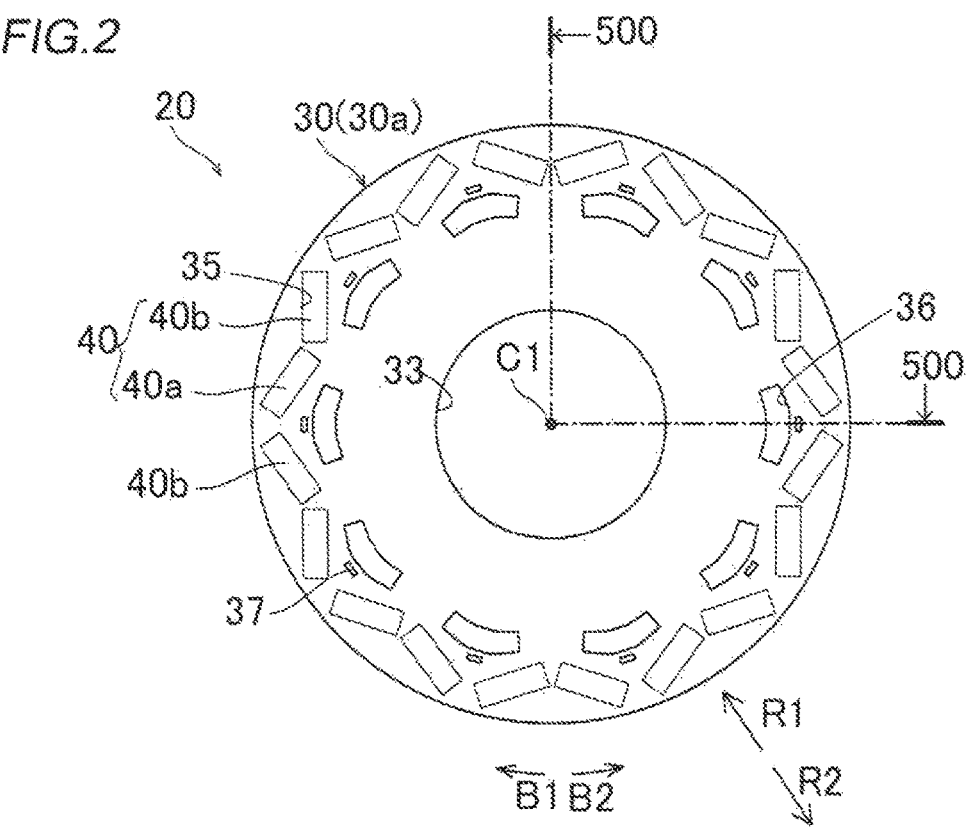
FIG. 2 is a front view of the rotor (an electric steel plate that is not provided with a second portion) according to the first embodiment.

As illustrated in FIG. 2, the rotor 100 has a plurality of permanent magnets 40 that are embedded in the rotor core 20. That is, the rotor 100 configures a part of an interior permanent magnet motor (IPM motor) in which the permanent magnets 40 are embedded in the rotor 100.

The permanent magnets 40 are provided along the rotor core 20 in the circumferential direction when viewed in the rotational axis direction. In the permanent magnets 40, one pole is configured of a pair of a permanent magnet 40a and a permanent magnet 40b that are disposed in a generally V-shape when viewed in the rotational axis direction. For example, in the rotor 100, ten pairs of the permanent magnet 40a and the permanent magnet 40b are provided. That is, ten poles are configured of twenty permanent magnets 40.

Figure 3:
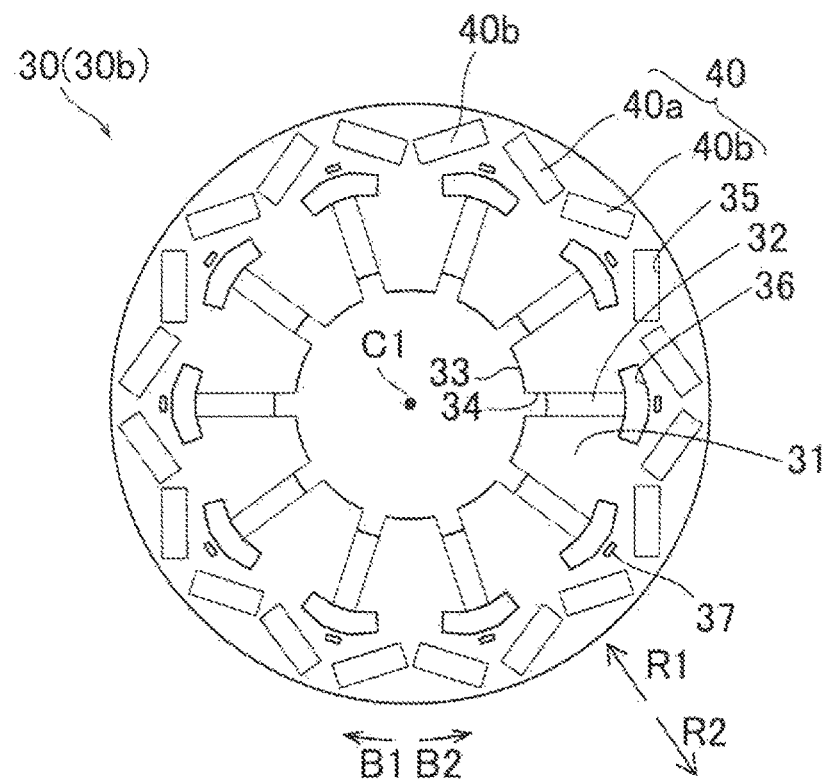
FIG. 3 is a front view of an electric steel plate that is provided with the second portion.
Figure 4:
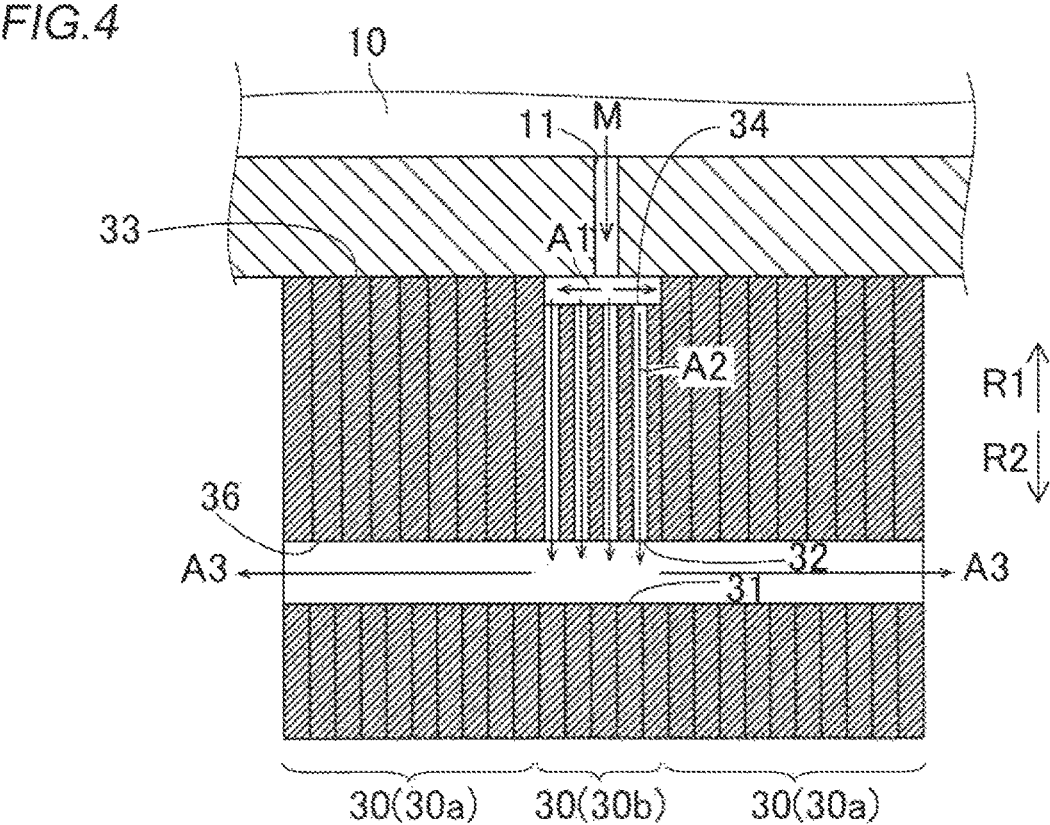
FIG. 4 is a partially enlarged view of FIG. 1.

In the first embodiment, as illustrated in FIGS. 3 and 4, at least some electric steel plates 30 (electric steel plates 30b) among the electric steel plates 30 each include a first portion 31 that has a thickness t1 (see FIG. 5) in the rotational axis direction and a second portion 32 that has a thickness t2 (see FIG. 5) in the rotational axis direction, which is thinner than the first portion 31, and that extends in the radial direction. The second portion 32 has a groove shape. The second portion 32 forms a flow path A2 through which the coolant M that is supplied from the coolant supply port 11 of the shaft 10 flows. The thickness t1 and the thickness t2 are examples of a "first thickness" and a "second thickness" in the scope of the claims, respectively.

Specifically, in the first embodiment, the electric steel plates 30 include a plurality of electric steel plates 30a that are not provided with the second portion 32 and a plurality of electric steel plates 30b that are provided with the second portion 32, as illustrated in FIG. 4. The electric steel plates 30b that are provided with the second portion 32 are disposed near the central portion in a direction along the rotational axis direction, among the stacked electric steel plates 30. The electric steel plates 30b are stacked into one mass (that is, the electric steel plate 30a is not sandwiched between the electric steel plates 30b). The electric steel plate 30a and the electric steel plate 30b are examples of a "first electric steel plate" and a "second electric steel plate" in the scope of the claims, respectively.

Figure 5:
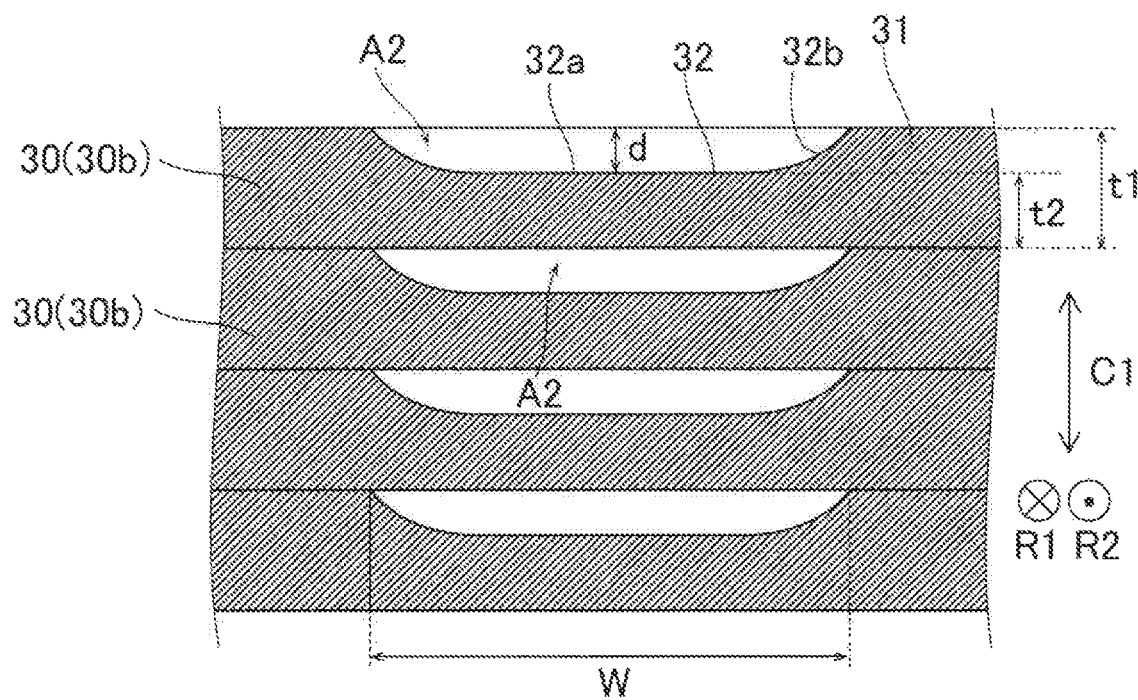
FIG. 5 is a sectional view of the second portion viewed in a radial direction.
Figure 6:
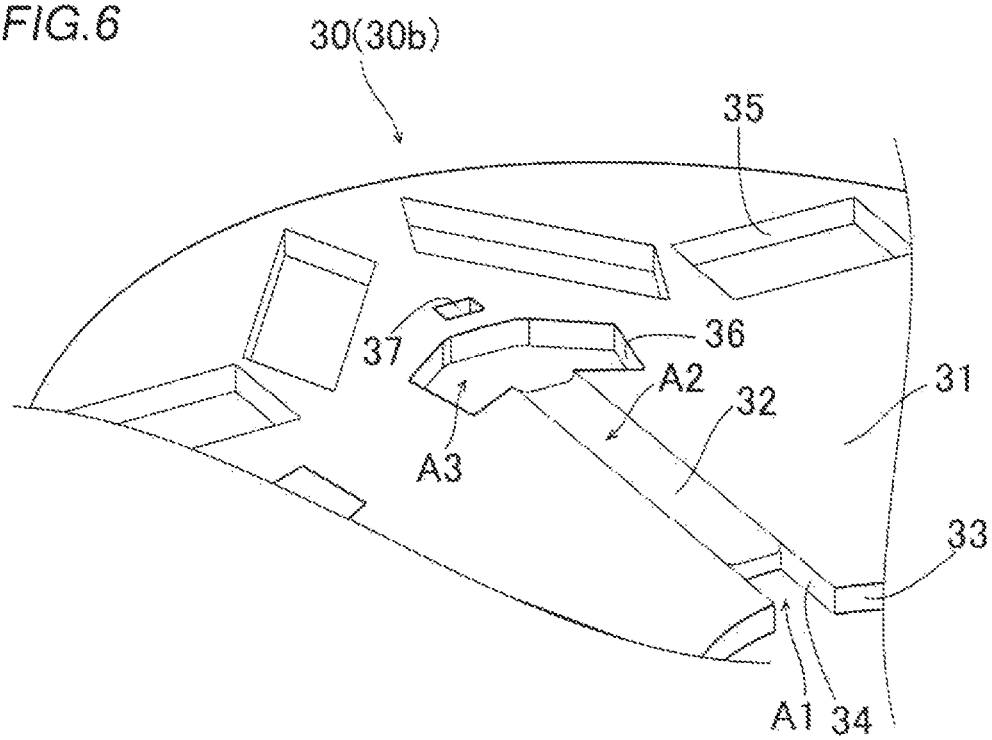
FIG. 6 is a perspective view of the electric steel plate that is provided with the second portion according to the first embodiment.
Figure 7:
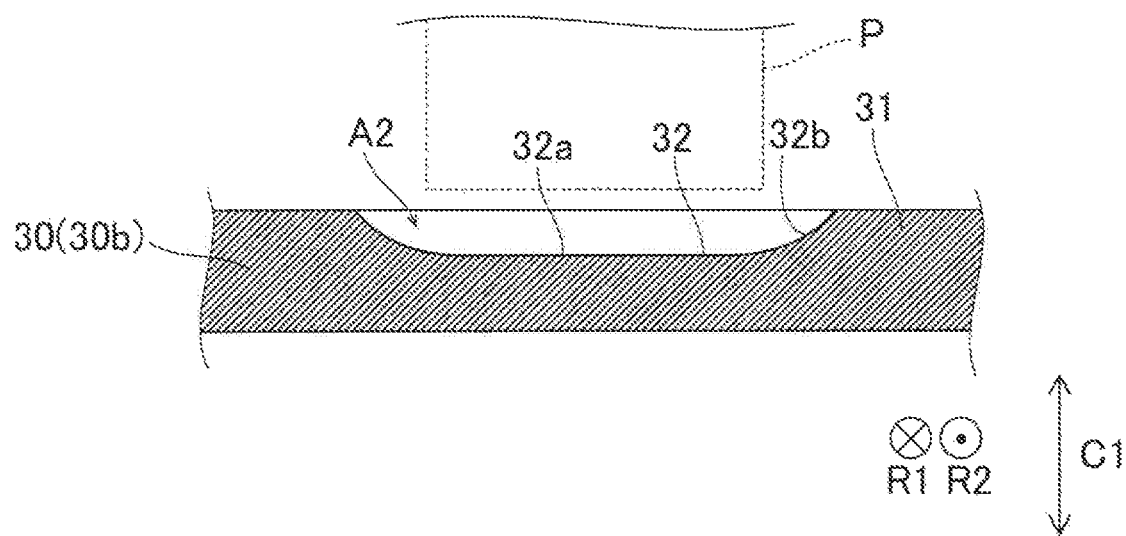
FIG. 7 is a sectional view for explaining a step of forming the second portion.

In the first embodiment, each second portion 32 of the electric steel plate 30 (electric steel plate 30b) is formed (machined) to have a groove shape by pressing (press working) the electric steel plate 30 in a thickness direction (a direction along the rotational axis direction (C1)), as illustrated in FIGS. 5 and 6. That is, the electric steel plate 30b that has the second portion 32 is obtained by further press working the electric steel plate 30a in the thickness direction. For example, the electric steel plate 30 is formed by blanking a strip-shaped electric steel plate (not shown). Specifically, in the strip-shaped electric steel plate, an outer edge portion of the electric steel plate 30 is blanked after a step of blanking a shaft insertion hole portion 33 (shaft insertion hole), a notch portion 34 (notch), a magnet insertion hole portion 35 (magnet insertion hole), and a coolant hole portion 36 (coolant hole) with a punch (not shown), and a step of forming a clinch protrusion 37 with a punch (not shown). In this way, one electric steel plate 30 is formed. At any time during the steps described above, the second portion 32 is formed by pressing (press working) the strip-shaped electric steel plate (or the electric steel plate 30b) with a punch P, as illustrated in FIG. 7.

Since the second portion 32 is formed by being pressed with the punch P, a bottom surface 32a of the second portion 32 has a generally flat surface. A portion 32b near a boundary between the first portion 31 and the second portion 32 has a curved shape in a section of the electric steel plate 30 taken along the thickness direction. That is, the thickness t2 of the second portion 32 becomes gradually thinner from the boundary between the first portion 31 and the second portion 32.

A depth d of the second portion 32 is less than half the thickness (thickness t1) of the electric steel plate 30. Specifically, the depth d of the second portion 32 is equal to or less than 30% of the thickness (thickness t1) of the electric steel plate 30. In this way, it is possible to suppress the strength of the electric steel plate 30 from decreasing due to the thickness t2 of the second portion 32 becoming excessively thin. The depth d of the second portion 32 is less than a width W of the second portion 32 in a direction along the circumferential direction. The second portion 32 is provided only on a surface on one side of the electric steel plate 30 in the rotational axis direction. It is thus possible to suppress the strength of the electric steel plate 30 from decreasing, unlike the case in which the second portion 32 is provided on both faces of the electric steel plate 30. The second portion 32 that is provided on each stacked electric steel plate 30b is provided independently so as not to be connected to the other second portions 32. That is, the flow paths A2 are formed individually by the second portion 32 that is provided on each electric steel plate 30b.

The second portion 32 is pressed with the punch P so that the second portion 32 is work hardened. Work hardening is a phenomenon in which the hardness of a metal is increased by plastic deformation when stress is applied to the metal. Work hardening is also called strain hardening. Since the hardness of the second portion 32 becomes relatively high, the strength of the electric steel plate 30 is improved.

In the first embodiment, a plurality of the second portions 32 of the electric steel plate 30 (electric steel plate 30b) are provided in accordance with a plurality of the poles that are configured of the permanent magnets 40 when viewed in the rotational axis direction, as illustrated in FIG. 3. Specifically, as described above, one pole is configured of a pair of the permanent magnet 40a and the permanent magnet 40b. Ten poles are provided in the rotor 100. In one electric steel plate 30, ten second portions 32 are provided. Each second portion 32 is provided between two poles that are adjacent in the circumferential direction. That is, the second portion 32 is provided between the permanent magnet 40a of one of the two poles and the permanent magnet 40b of the other one of the two poles.

In the first embodiment, the second portions 32 that are provided in the electric steel plate 30 (electric steel plate 30b) have the same shape as each other when viewed in the rotational axis direction and the thickness t2 of each second portion 32 in the rotational axis direction is mutually the same. Specifically, the second portion 32 has a generally rectangular shape that extends in the radial direction when viewed in the rotational axis direction. The sectional shapes (see FIG. 5) of the second portions 32 are mutually the same. The second portions 32 are provided at substantially regular angular intervals when viewed in the rotational axis direction. In this way, it is possible to rotate the rotor 100 in a well-balanced manner, unlike the case in which the second portions 32 are not provided at substantially regular angular intervals (the case in which the second portions 32 are provided in an imbalanced manner).

In the first embodiment, the electric steel plate 30 (electric steel plate 30b) includes the shaft insertion hole portion 33 in which the shaft 10 is inserted. The second portion 32 is provided so as to extend in the radial direction from the shaft insertion hole portion 33 (radially inner side) to a coolant M outlet (permanent magnet 40 side, radially outer side) of the electric steel plate 30 when viewed in the rotational axis direction. The term "from the shaft insertion hole portion 33 to the coolant M outlet" includes a concept of the term "between the shaft insertion hole portion 33 and the coolant M outlet". Specifically, the electric steel plate 30 includes the notch portion 34 that is provided so as to be continuous with the shaft insertion hole portion 33 and that configures the flow path A1 for the coolant M along the rotational shaft direction, as illustrated in FIGS. 3 and 6. The second portion 32 is provided so as to extend in the radial direction from the notch portion 34 to the coolant M outlet of the electric steel plate 30 when viewed in the rotational axis direction. The notch portion 34 has a generally rectangular shape when viewed in the rotational axis direction. The number of notch portions 34 provided is the same as the number of second portions 32. In this way, the coolant M flows smoothly into the second portions 32. In the radial direction, the length of the notch portion 34 is shorter than the length of the second portion 32.

As illustrated in FIG. 4, at least some electric steel plates 30b are configured so as to overlap with the coolant supply port 11 of the shaft 10 when viewed in the radial direction. The notch portions 34 of the stacked second electric steel plates 30b configure the flow path A1 for the coolant M in the direction along the rotational shaft direction. Here, the flow path A1 is in communication with the second portion 32 of the electric steel plate 30b.

In the first embodiment, the electric steel plate 30 (electric steel plate 30a, electric steel plate 30b) includes a magnet insertion hole portion 35 in which the permanent magnet 40 is inserted, as illustrated in FIG. 3. The electric steel plate 30 (electric steel plate 30a) is provided on the shaft insertion hole portion 33 side (radially inner side) of the magnet insertion hole portion 35 and includes a coolant hole portion 36 that configures a flow path A3 (see FIG. 4) for the coolant M in the direction along the rotational axis direction. The second portion 32 is provided so as to extend from the shaft insertion hole portion 33 to the coolant hole portion 36 of the electric steel plate 30, the coolant hole portion 36 serving as the coolant M outlet, when viewed in the rotational axis direction. Specifically, the second portion 32 is provided so as to extend from the notch portion 34 to the coolant hole portion 36 of the electric steel plate 30.

The magnet insertion hole portion 35 has a generally rectangular shape so as to correspond to the shape of the permanent magnet 40 when viewed in the rotational axis direction. The coolant hole portion 36 has an arc shape that protrudes to the radially outer side when viewed in the rotational axis direction. The permanent magnet 40a that configures one of the poles that are adjacent in the circumferential direction and the permanent magnet 40b that configures the other pole form a V shape that protrudes to the radially outer side. The arc-shaped coolant hole portion 36 is disposed between the permanent magnet 40a and the permanent magnet 40b that form the V shape that protrudes to the radially outer side. That is, it is possible to dispose the coolant hole portion 36 near the permanent magnet 40a and the permanent magnet 40b by forming the coolant hole portion 36 in an arc shape.

The clinch protrusion 37 is provided between the coolant hole portion 36 and the permanent magnet 40 when viewed in the rotational axis direction. A plurality (the same number as that of the second portions 32) of the clinch protrusions 37 are provided along the circumferential direction.

(How Coolant Flows)

The way in which the coolant M flows will be described with reference to FIG. 4. The coolant M flows from the coolant supply port 11 into the flow path A1 of the rotor core 20 after the coolant M moves through the hollow shaft 10 along the rotational axis direction. The flow path A1 is configured of the notch portion 34 of the stacked electric steel plates 30b. The coolant M flows from the notch portion 34 into the second portion 32 (flow path A2). The coolant M then flows from the second portion 32 into the flow path A3. The flow path A3 is configured of the coolant hole portion 36 of the stacked electric steel plates 30b. The coolant M is then discharged from the flow path A3 to the outside of the rotor core 20.

Second Embodiment

Figure 8:
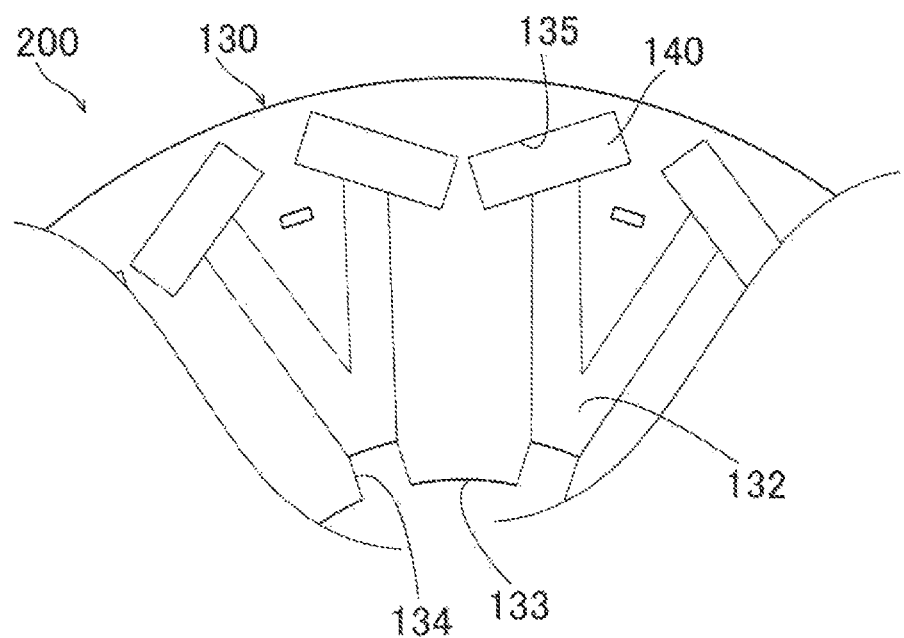
FIG. 8 is a front view of a rotor (an electric steel plate that is not provided with a second portion) according to a second embodiment.

The configuration of a rotor 200 according to a second embodiment will be described with reference to FIG. 8. In the second embodiment, a second portion 132 extends to a magnet insertion hole portion 135.

An electric steel plate 130 of the rotor 200 includes the magnet insertion hole portion 135 in which a permanent magnet 140 is inserted. The second portion 132 is provided so as to extend from a shaft insertion hole portion 133 to the magnet insertion hole portion 135 of the electric steel plate 130 when viewed in the rotational axis direction. Specifically, the second portion 132 is provided so as to extend from a notch portion 134 to the magnet insertion hole portion 135 of the electric steel plate 130 when viewed in the rotational axis direction. A plurality of the second portions 132 are provided at substantially regular angular intervals in the circumferential direction. A clearance (not shown) is provided between the permanent magnet 140 and the magnet insertion hole portion 135. After the coolant M flows from the second portion 132 into the clearance of the magnet insertion hole portion 135, the coolant M is discharged from the magnet insertion hole portion 135.

The other components of the second embodiment are the same as those of the first embodiment described above.

Effects of First Embodiment and Second Embodiment

In the first and second embodiments, the following effects can be obtained.

In the first and second embodiments, at least some electric steel plates (30, 130) among the electric steel plates (30, 130) include the groove-shaped second portion (32, 132) that extends in the radial direction and that configures the flow path (A2) through which the coolant (M) supplied from the coolant supply port (11) of the shaft (10) flows, as described above. Unlike the case in which a slit (hole portion) that extends in the radial direction is formed in the electric steel plate (30, 130) so as to form a flow path for the coolant (M), the decrease in the strength of the electric steel plate (30, 130) resulting from forming the flow path (second portion (32, 132)) is suppressed by the groove-shaped second portion (32, 132). Thus, when the rotor (100, 200) is rotated at a high speed, stress that is applied to a part (bridge portion) of the rotor core (20) that has a relatively small thickness (width) when viewed in the rotational axis direction is decreased. Here, such a part is the vicinity of the magnet insertion hole portion (35, 135) in which the permanent magnet (40, 140) is inserted. As a result, it is possible to suppress the strength of the rotor core (20) from decreasing even when the flow path (A2) through which the coolant (M) flows is provided in the rotor core (20).

In the first and second embodiments, the second portion (32, 132) of the electric steel plate (30, 130) is formed (machined) to have a groove shape by pressing (press working) the electric steel plate (30, 130) in the thickness direction, as described above. With such a configuration, the second portion (32, 132) is work hardened and it is thus possible to improve the strength (rigidity) of the electric steel plate (30, 130). As a result, it is possible to further suppress the strength of the rotor core (20) from decreasing.

In the first and second embodiments, the second portions (32, 132) of the electric steel plates (30, 130) are provided in accordance with the poles that are formed by the permanent magnets (40, 140) when viewed in the rotational axis direction, as described above. With such a configuration, it is possible to efficiently cool the permanent magnets (40, 140). As a result, it is possible to decrease demagnetization resulting from an increase in the temperature of the permanent magnet (40, 140).

In the first and second embodiments, the second portions (32, 132) that are provided in the electric steel plates (30, 130) have the same shape as each other and the thickness (t2) of each second portion (32, 132) in the rotational axis direction is mutually the same when viewed in the rotational axis direction, as described above. With such a configuration, it is possible to rotate the rotor (100, 200) in a well-balanced manner, since the occurrence of weight deviation of each part of the rotor core (20) is suppressed, compared to a case in which the shape and the thickness of the second portions (32, 132) are different from each other.

In the first and second embodiments, the second portion (32, 132) is provided so as to extend in the radial direction from the shaft insertion hole portion (33, 133) to the coolant (M) outlet of the electric steel plate (30, 130) when viewed in the rotational axis direction, as described above. With such a configuration, the coolant (M) flows through near the permanent magnet (40, 140) since the coolant (M) outlet is provided near the permanent magnet (40, 140). It is thus possible to effectively cool the permanent magnet (40, 140).

In the first and second embodiments, the second portion (32, 132) is provided so as to extend from the notch portion (34, 134) to the permanent magnet (40, 140) side of the electric steel plate (30, 130) when viewed in the rotational axis direction, as described above. With such a configuration, the coolant (M) supplied from the coolant supply port (11) of the shaft (10) flows into each second portion (32, 132) of the stacked electric steel plates (30, 130) via the notch portion (34, 134) (by moving along in the rotational shaft direction). In this way, it is possible to make the coolant (M) flow into each second portion (32, 132) of the stacked electric steel plates (30, 130) without providing a plurality of the coolant supply ports (11) of the shaft (10) along the rotational shaft direction.

In the first and second embodiments, at least some electric steel plates (30b) are configured so as to overlap with the coolant supply port (11) of the shaft (10) when viewed in the radial direction, as described above. The notch portions (34, 134) of the stacked second electric steel plates (30b) configure the flow path (A1) for the coolant (M) in the direction along the rotational shaft direction. Here, the flow path (A1) is in communication with the second portion (32, 132) of the electric steel plate (30b). With such a configuration, it is possible to make the coolant (M) flow from the coolant supply port (11) into each second portion (32, 132) of the second electric steel plates (30b) via the flow path (A1) that is configured of the notch portions (34, 134).

In the first embodiment, the second portion (32) is provided so as to extend from the shaft insertion hole portion (33) to the coolant hole portion (36) of the electric steel plate (30) when viewed in the rotational axis direction, as described above. With such a configuration, it is possible to cool the permanent magnet (40) via the rotor core (20), since the coolant (M) flows into the coolant hole portion (36) that is provided on the shaft insertion hole portion (33) side (radially inner side) of the permanent magnet (40).

In the second embodiment, the second portion (132) is provided so as to extend from the shaft insertion hole portion (133) to the magnet insertion hole portion (135) of the electric steel plate (130) when viewed in the rotational axis direction, as described above. With such a configuration, it is possible to cool the permanent magnet (140) directly with the coolant (M), since the coolant (M) flows into the magnet insertion hole portion (135). It is thus possible to efficiently cool the permanent magnet (140).

In the first and second embodiments, the electric steel plates (30b) that are provided with the second portion (32, 132) are disposed near the central portion in the direction along the rotational axis direction, among the stacked electric steel plates (30, 130), as described above. With such a configuration, in the stacked electric steel plates (30, 130), the electric steel plates (30a) are disposed on both end portions in the direction along the rotational axis direction and the electric steel plates (30b) are disposed near the central portion. Since the occurrence of weight deviation of the rotor core (20) is thus suppressed in one end side and the other end side in the rotational axis direction, it is possible to rotate the rotor (100, 200) in a well-balanced manner.

MODIFICATION

The embodiments disclosed herein should be considered as exemplary and non-limiting in all respects. The scope of the disclosure is defined by the scope of the claims, rather than the description of the embodiments, and includes the scope of the claims and all changes (modifications) that fall within the meaning and scope of equivalence.

In the first and second embodiments, examples are shown in which the rotor is configured as a so-called inner rotor disposed radially inward of the stator. However, the disclosure is not limited to this. That is, the rotor may be configured as an outer rotor.

Figure 9:
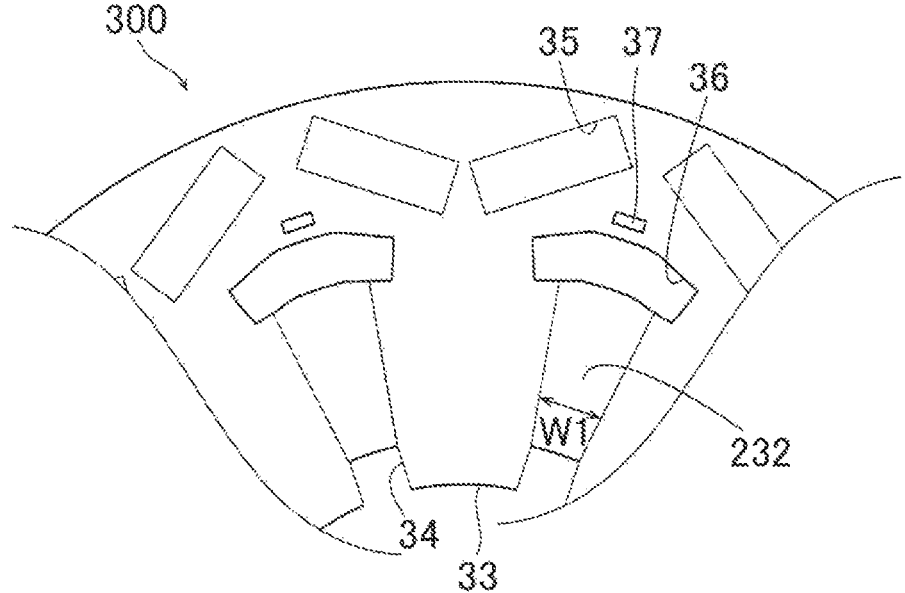
FIG. 9 is a front view of a rotor (an electric steel plate that is provided with a second portion) according to a first modification of the first and second embodiments.

In the first and second embodiments, examples are shown in which the width of the second portion is generally constant in the circumferential direction. However, the disclosure is not limited to this. For example, as is the case with a rotor 300 according to a first modification illustrated in FIG. 9, the rotor may be configured so that the width of a second portion 232 gradually increases (widens) toward the radially outer side in the circumferential direction. In this way, the coolant M can flow smoothly.

Figure 10:
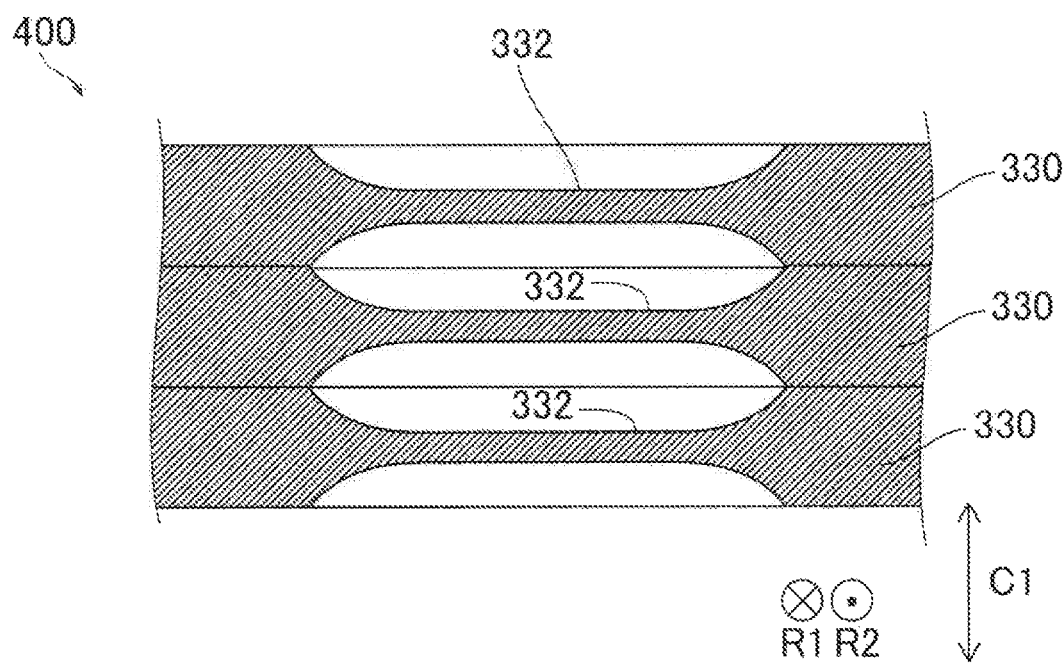
FIG. 10 is a figure of a second portion of a rotor according to a second modification of the first and second embodiments when viewed in the radial direction.

In the first and second embodiments, examples are shown in which the second portion is provided only on the surface on one side of the electric steel plate in the rotational axis direction. However, the disclosure is not limited to this. For example, as is the case with a rotor 400 according to a second modification illustrated in FIG. 10, a second portion 332 may be provided on both surfaces of the electric steel plate 330. In this way, the second portions 332 of the electric steel plates 330 that are stacked in the rotational axis direction are connected to each other so that the cross-sectional area of the flow path can be increased. As a result, the coolant M can flow smoothly.

In the first and second embodiments, examples are shown in which the electric steel plate is pressed in the thickness direction so that the second portion of the electric steel plate is machined so as to have a groove shape. However, the disclosure is not limited to this. For example, the second portion may be formed by cutting the electric steel plate.

In the first and second embodiments, examples are shown in which the number of poles and the number of second portions of the rotor are the same. However, the disclosure is not limited to this. For example, one second portion may be provided for every two poles.

In the first and second embodiments, examples are shown in which the second portions that are provided in the electric steel plate have the same shape as each other and also have the same thickness. However, the disclosure is not limited to this. For example, the shape and the thickness of the second portions that are provided in the electric steel plate may be different.

In the second embodiment, an example is shown in which the second portion extends from the shaft insertion hole portion to the magnet insertion hole portion. However, the disclosure is not limited to this. For example, the second portion may be provided so as to extend from the shaft insertion hole portion to a clearance (a clearance for suppressing sneaking of a magnetic flux) that is provided so as to be continuous with the magnet insertion hole portion.

In the first and second embodiments, examples are shown in which the second portion is provided on the electric steel plate that is disposed near the central portion in the direction along the rotational axis direction, among the stacked electric steel plates. However the disclosure is not limited to this. For example, the second portion may be provided on all of the stacked electric steel plates.

In the first and second embodiments, examples are shown in which the coolant outlet is the coolant hole portion or the magnet insertion hole portion. However, the disclosure is not limited to this. For example, the second portion may be formed so as to extend to the end portion on the radially outer side of the rotor and the coolant outlet may be provided on the end portion on the radially outer side of the rotor.

In the first and second embodiments, examples are shown in which the second portion is provided from the notch portion to the coolant outlet. However, the disclosure is not limited to this. For example, the second portion may be provided from the shaft insertion hole portion to the coolant outlet without providing the notch portion.

The invention claimed is:

1. A rotor comprising:
   a shaft;
   a rotor core that is attached to the shaft and that is configured of a plurality of electric steel plates that are stacked; and
   a permanent magnet that is embedded in the rotor core, wherein:
   a coolant supply port that supplies a coolant to the rotor core is provided in the shaft, and
   at least two electric steel plates of the plurality of electric steel plates each include:
   a first portion that has a first thickness in a rotational axis direction,
   a second portion that has a second thickness in the rotational axis direction, which is thinner than the first portion, the second portion extending in a radial direction and configuring a flow path through which the coolant supplied from the coolant supply port of the shaft flows, and
   a notch that is provided so as to be continuous with the second portion of one of the electric steel plates and continuous with a shaft insertion hole in which the shaft is inserted and configures a flow path in the rotational axis direction, and
   a plurality of the electric steel plates provided with the second portion and the notch are laminated so as to be continuous with one side and the other side in the rotational axis direction with respect to the coolant supply port.

2. The rotor according to claim 1, wherein the second portion of the at least two electric steel plate is formed to have a groove shape by pressing the at least two electric steel plate in a thickness direction.

3. The rotor according claim 1, wherein
   the permanent magnet includes a plurality of permanent magnets that are provided along a circumferential direction of the rotor core when viewed in the rotational axis direction, and
   a plurality of the second portions of the at least two electric steel plates are provided in accordance with a plurality of poles that are formed by the plurality of permanent magnets when viewed in the rotational axis direction.

4. The rotor according to claim 3, wherein the plurality of the second portions that are provided in the at least two electric steel plates have a same shape as each other when viewed in the rotational axis direction and the second thickness of each second portion in the rotational axis direction is mutually the same.

5. The rotor according to claim 1, wherein
   the second portion is provided so as to extend in a radial direction from the shaft insertion hole to a coolant outlet of the plurality of electric steel plates when viewed in the rotational axis direction.

6. The rotor according to claim 5, wherein
   the second portion is provided so as to extend in the radial direction from the notch to the coolant outlet of the plurality of electric steel plates when viewed in the rotational axis direction.

7. The rotor according to claim 6, wherein
the plurality of electric steel plates that are stacked include a plurality of first electric steel plates that are not provided with the second portion and a plurality of second electric steel plates that are provided with the second portion,
at least two second electric steel plates of the plurality of second electric steel plates are configured so as to overlap with the coolant supply port of the shaft when viewed in the radial direction, and
the notches of the plurality of second electric steel plates that are stacked configure a flow path for the coolant along the rotational shaft direction, the flow path being in communication with the second portions of the plurality of second electric steel plates.

8. The rotor according to claim 5, wherein
the plurality of electric steel plates include a magnet insertion hole in which the permanent magnet is inserted and a coolant hole that is provided on the shaft insertion hole side of the magnet insertion hole and that configures a flow path for the coolant along the rotational axis direction, the coolant hole serving as the coolant outlet, and
the second portion is provided so as to extend from the shaft insertion hole to the coolant hole of the plurality of electric steel plates when viewed in the rotational axis direction.

9. The rotor according to claim 5, wherein
the plurality of electric steel plates include a magnet insertion hole in which the permanent magnet is inserted, and
the second portion is provided so as to extend from the shaft insertion hole to the magnet insertion hole of the plurality of electric steel plate when viewed in the rotational axis direction.

10. The rotor according to claim 1, wherein
the electric steel plates include a plurality of first electric steel plates that are not provided with the second portion and a plurality of second electric steel plates that are provided with the second portion, and
the plurality of second electric steel plates that are provided with the second portion are disposed near a center in a direction along the rotational axis direction, among the plurality of electric steel plates that are stacked.

* * * * *